(12) United States Patent
Harris et al.

(10) Patent No.: US 10,970,660 B1
(45) Date of Patent: Apr. 6, 2021

(54) COMMUNITY-BASED DATA ANALYSIS IN A SOFTWARE-AS-A-SERVICE SYSTEM USING A DEEP LEARNING CLASSIFIER

(71) Applicant: Coupa Software Incorporated, San Mateo, CA (US)

(72) Inventors: Scott Harris, Menlo Park, CA (US); Vincent Toesca, San Francisco, CA (US)

(73) Assignee: Coupa Software Incorporated, San Mateo, CA (US)

( * ) Notice: Subject to any disclaimer, the term of this patent is extended or adjusted under 35 U.S.C. 154(b) by 159 days.

(21) Appl. No.: 16/273,473

(22) Filed: Feb. 12, 2019

Related U.S. Application Data

(60) Provisional application No. 62/698,369, filed on Jul. 16, 2018.

(51) Int. Cl.
*G07F 19/00* (2006.01)
*G06Q 10/06* (2012.01)
*G06Q 40/00* (2012.01)
*G06N 3/08* (2006.01)
*G06Q 10/08* (2012.01)

(52) U.S. Cl.
CPC ......... *G06Q 10/06312* (2013.01); *G06N 3/08* (2013.01); *G06Q 10/0637* (2013.01); *G06Q 10/087* (2013.01); *G06Q 40/125* (2013.12)

(58) Field of Classification Search
CPC ... G06Q 40/125; G06Q 10/06312; G06N 3/08
USPC ..................................................... 705/30, 35
See application file for complete search history.

(56) References Cited

U.S. PATENT DOCUMENTS

| | | | | |
|---|---|---|---|---|
| 7,606,750 B1* | 10/2009 | Hoag | ................... | G06Q 20/108 705/30 |
| 8,234,195 B1* | 7/2012 | Berhanu | ................ | G06Q 40/02 705/35 |
| 8,660,984 B1* | 2/2014 | Bhattacharyya | ... | G06Q 20/3224 707/602 |
| 8,855,377 B1* | 10/2014 | Madhani | ................ | G06Q 20/24 382/115 |
| 8,996,417 B1* | 3/2015 | Channakeshava | .......................... | G06Q 20/3224 705/30 |
| 2007/0168267 A1* | 7/2007 | Zimmerman | .......... | G06Q 40/00 705/35 |

* cited by examiner

*Primary Examiner* — Rokib Masud
(74) *Attorney, Agent, or Firm* — Baker Botts L.L.P.

(57) ABSTRACT

Techniques for community-based spend analysis in a software as a service computing environment are disclosed. The techniques leverage information available about community spend to provide new insights into a particular customer's spend. The new insights result from using a trained deep learning classifier to classify spend data lines from both the community of customers and the particular customer in standard spend categories. The spend data lines may be from invoices, requisitions and purchase orders, for example. According to some of the techniques, after classifying the spend data lines in standard spend categories, a highly accurate community-based comparison between spend of the community versus spend of the particular customer in one or more particular standard spend categories is provided in a graphical user interface.

17 Claims, 9 Drawing Sheets

COMMUNITY-BASED DATA ANALYSIS IN A SOFTWARE-AS-A-SERVICE SYSTEM USING A DEEP LEARNING CLASSIFIER

PRIORITY CLAIM

This application claims the benefit of U.S. provisional application No. 62/698,369, filed Jul. 16, 2018, the entire contents of which is hereby incorporated by reference as if fully set forth herein.

TECHNICAL FIELD

Aspects of the disclosure relate generally to centralized computing on the internet. More specifically, aspects of the disclosure relate to techniques for community-based data analysis in a software as a service computing environment using a deep learning classifier.

BACKGROUND

Traditionally, businesses conducted spend analysis by maintaining multidimensional "spend" cubes in spreadsheets. The dimensions of the cube included commodities (what the business is buying), suppliers (who the business is buying the commodities from), and customers (who in the business is buying the commodities). Each dimension of the cube conveyed useful information about spend by the business. The commodity dimension told what types of good and services the business purchased. The customer dimension identified which business units/departments were the spend cost centers. The supplier dimension told which suppliers the business was paying for good and services. By organizing business spend data this way, the business could develop an overall sourcing strategy including supplier monitoring, supplier consolidation and supplier diversification.

One problem encountered by businesses conducting spend analysis using spreadsheets was scalability. A typical spreadsheet was not well-suited to process hundreds or thousands or more rows of spend data. Data inconsistencies and data formatting issues were also prevalent. Further, maintaining spreadsheets was typically a manual process, resulting in a significant time lag between when new spend data was generated and the spreadsheets updated. As a result, the usefulness of reports and analysis generated based on the spreadsheets was limited.

The expansion of the internet has brought about a new class of centralized computing. Historically, centralized computing was implemented by mainframe computers in a time-sharing or utility computing model. More recently, application service providers (ASPs) provided businesses with the service of hosting and management of specialized business applications on the internet, with the benefit to the businesses of reducing costs through central administration and through the service provider's specialization in a particular business application.

More recently, an extension of the ASP centralized computing model known as "Software as a Service," or SaaS, has emerged. SaaS differs from the ASP computing model in at least a few ways. For one, SaaS vendors typically develop and manage their own software, while ASPs primarily focused on managing and hosting third-party software. For another, many ASPs offered more traditional client-server applications, requiring installation of dedicated client software on users' personal computers. In contrast, SaaS solutions often require only an industry-standard web browser to use. Another difference is in the architecture. Most ASPs maintained separate application instances for each business served. SaaS providers, in contrast, normally utilize a multi-tenant architecture, in which the application serves multiple businesses and users, with data partitioned accordingly by data and network access controls.

Today, businesses conduct spend analysis online using SaaS solutions, including for example, Coupa™, Basware™, BirchStreet Systems™, Capgemini (IBX)™, Determine (b-pack)™, GEP™, Ivalua™, Proactis™, Ariba™, and Wax Digital, to name a few. SaaS solutions provide a number of benefits over using spreadsheets for spend analysis, including for example easier and quicker data visualizations, the ability to manage and analyze larger amounts of data in a timelier manner, more possibilities for customization, and more rapid approach to defining and executing queries and saving results therefrom.

Notwithstanding the benefits of existing SaaS solutions for spend analysis, business would appreciate deeper and timelier insights into their spend including how best to manage spend categories.

BRIEF DESCRIPTION OF THE DRAWINGS

FIG. 8 depicts an example graphical user interface for community-based spend analysis in a selected individual spend category.

DETAILED DESCRIPTION

Figure 1:
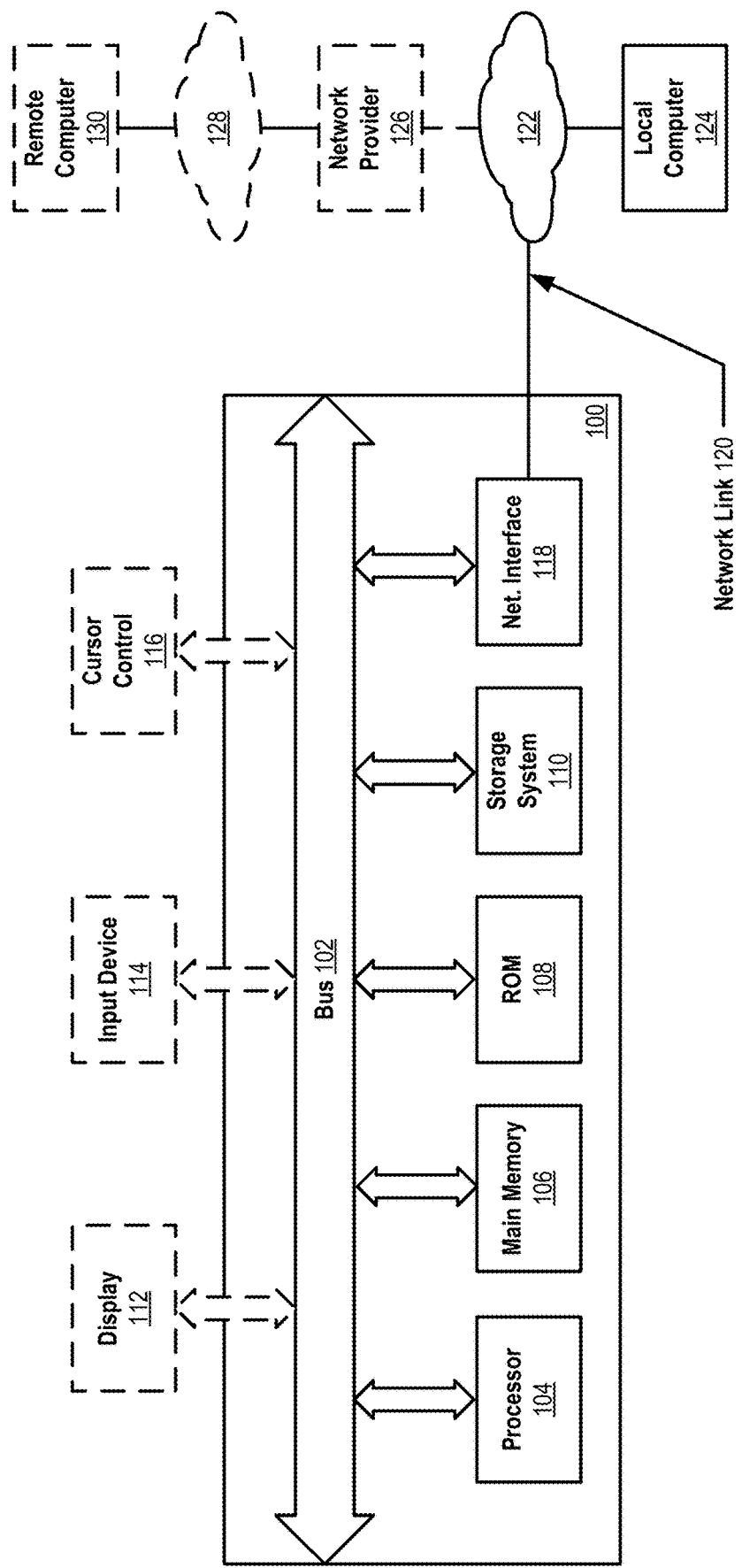
FIG. 1 is a block diagram of a computer system in which techniques for community-based spend analysis in a software as a service computing environment may be embodied.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Community-Based Spend Analysis

Techniques for community-based spend analysis in a software as a service computing environment are disclosed.

Here, the community may be defined as a set of customers that use a spend management cloud service in the software as a service computing environment for spend analysis and potentially other spend management functions.

Unconventionally, the techniques leverage information available about community spend to provide new insights into a particular customer's spend. The new insights result from using a trained deep learning classifier to classify spend data lines from both the community of customers and the particular customer in standard spend categories. The spend data lines may be from invoices, requisitions and purchase orders, for example.

Using the trained deep learning classifier, the spend data lines are classified into a set of standard spend categories where each standard spend category in the set represents a standard category of spend (e.g., "furniture and furnishings," "software," "telecom services," "office equipment," etc.) according to a standard hierarchical taxonomy of commodities. For example, the set of standard spend categories may be from the United Nations Standard Products and Services Code (UNSPSC). However, other standard hierarchical taxonomies of commodities can be used, including for example Common Procurement Vocabulary (CPV), GS1 Global Product Classification (GPC), or eCl@ss.

According to some of the techniques, after classifying the spend data lines in standard spend categories, a highly accurate community-based comparison between spend of the community versus spend of the particular customer in a particular standard spend category is provided. The highly accurate comparison is provided even if the spend data lines have inconsistent or new text descriptions of commodities (e.g., never before seen description or for a new commodity) in the particular standard spend category. The highly accurate comparison results from using the trained deep learning classifier to classify spend data lines in standard spend categories with high accuracy (e.g., greater than 95% accuracy).

According to some of the techniques, the highly accurate comparison is provided to the particular customer in a graphical user interface. For example, the graphical user interface may include a bar chart or other type of chart that compares: (1) a monetary amount of total spend by the particular customer during a period of time (e.g., 12 months) in a particular standard spend category with (2) a monetary amount of total average spend per customer in the community during the period of time in the particular standard spend category. The community can include all customers that use the spend management cloud service or a subset of all customers, such as a set of customers in a selected industry. With such a graphical user interface providing this community-based comparison, the particular customer can more easily monitor supplier spend in the particular standard spend category and more easily determine whether they are over spending in that particular standard spend category compared to the community.

It should be noted that while an aggregate (e.g., average, mean ignoring NaN values, median, sum, etc.) computed over a set of classified spend data lines for a particular customer or a community of customers may be an aggregate of monetary amounts, an aggregate computed over a set of classified spend data lines can be a count of spend transactions (e.g., requisitions, invoices, purchase orders, or a combination thereof) from which the classified spend data lines originate.

In addition to a text description of a commodity (e.g., a product, good or service available from a supplier), a spend data line may specify or be associated with a particular supplier that supplies that commodity. With this additional supplier information, additional highly accurate community-based comparisons can be provided based on classifying the spend data lines in standard spend categories.

For example, a graphical user interface may include side-by-side listings of top suppliers for the particular customer against top suppliers for the community. For example, the listing for the particular customer may list the top X number of suppliers by total monetary amount spent by the particular customer in the particular standard spend category during the period of time. And the listing for the community may list the top Y number of suppliers by average total monetary amount spent per customer in the community in the particular standard spend category during the period of time.

With such a graphical user interface providing this side-by-side community-based comparison, the particular customer can easily compare their top suppliers in the particular standard spend category against the top suppliers in the particular spend category for the community. From the comparison information presented in the graphical user interface, the particular customer may make better informed spend optimization decisions including better informed supplier diversification and supplier consolidation decisions. For example, the particular customer may discover that their top supplier in the particular standard spend category is different from the top supplier in the particular standard spend category for the community and take appropriate action.

According to some techniques, by classifying the spend data lines in standard spend categories, community-based spend optimization recommendations for the particular standard spend category are made to the particular customer. For example, a recommendation to regroup requisitions, purchase orders or invoices for the particular standard spend category to improve spend transaction efficiency may be made based on the number of spend transactions for the particular standard spend category by the particular customer during the period of time exceeding, by a threshold percentage (e.g., 50%), the number of spend transactions for the particular standard spend category by the community during the period of time.

The disclosed techniques for community-based spend analysis in a software as a service computing environment provide benefits over conventional approaches for spend analysis.

By using a trained deep learning classifier to classify spend data lines, the trained classifier may make highly accurate inferences of the correct standard commodity category for a given spend data line, even if the classifier has never "seen" the spend data line previously. For example, the trained classifier may infer that a spend data line having a text description of a commodity such as for example "plastic, 500 ml, Crystal Geyser" should be classified with a standard commodity category for "bottled water." Because of the highly accurate classifications by the trained classifier, more insightful comparisons may be made between the spend of a particular consumer and the spend of a community of consumers. Without using a trained deep learning classifier to classify spend data lines in standard spend categories, different spend data lines including never before seen spend data lines may be incorrectly classified into different spend categories even though they belong to the same spend category, which would reduce the effectiveness of comparisons with the community.

Computer-Based Implementation

FIG. 1 is a block diagram of a computer system 100 in which techniques for community-based spend analysis in a software as a service computing environment may be embodied.

The techniques may be performed as a method or process by a computing system having one or more processors and storage media. The one or more processors 104 and storage media 110 of the computing system may be provided by one or more computer systems 100. The storage media of the computing system may include one or more computer programs having instructions configured to perform the method or process.

In addition, or alternatively, the techniques may be embodied as instructions of one or more programs stored on one or more non-transitory computer-readable media (e.g., main memory 106 and/or storage system 110 of one or more computer systems 100) and configured for execution by one or more processors (e.g., one or more processors 104 of one or more computer systems 110) to perform the techniques.

In addition, or alternatively, the techniques may be embodied as instructions of one or more programs stored on storage media of a computing system and configured for execution by one or more processors of the computing system to perform the techniques.

Computer system 100 and its components is described in greater detail below.

Figure 2:
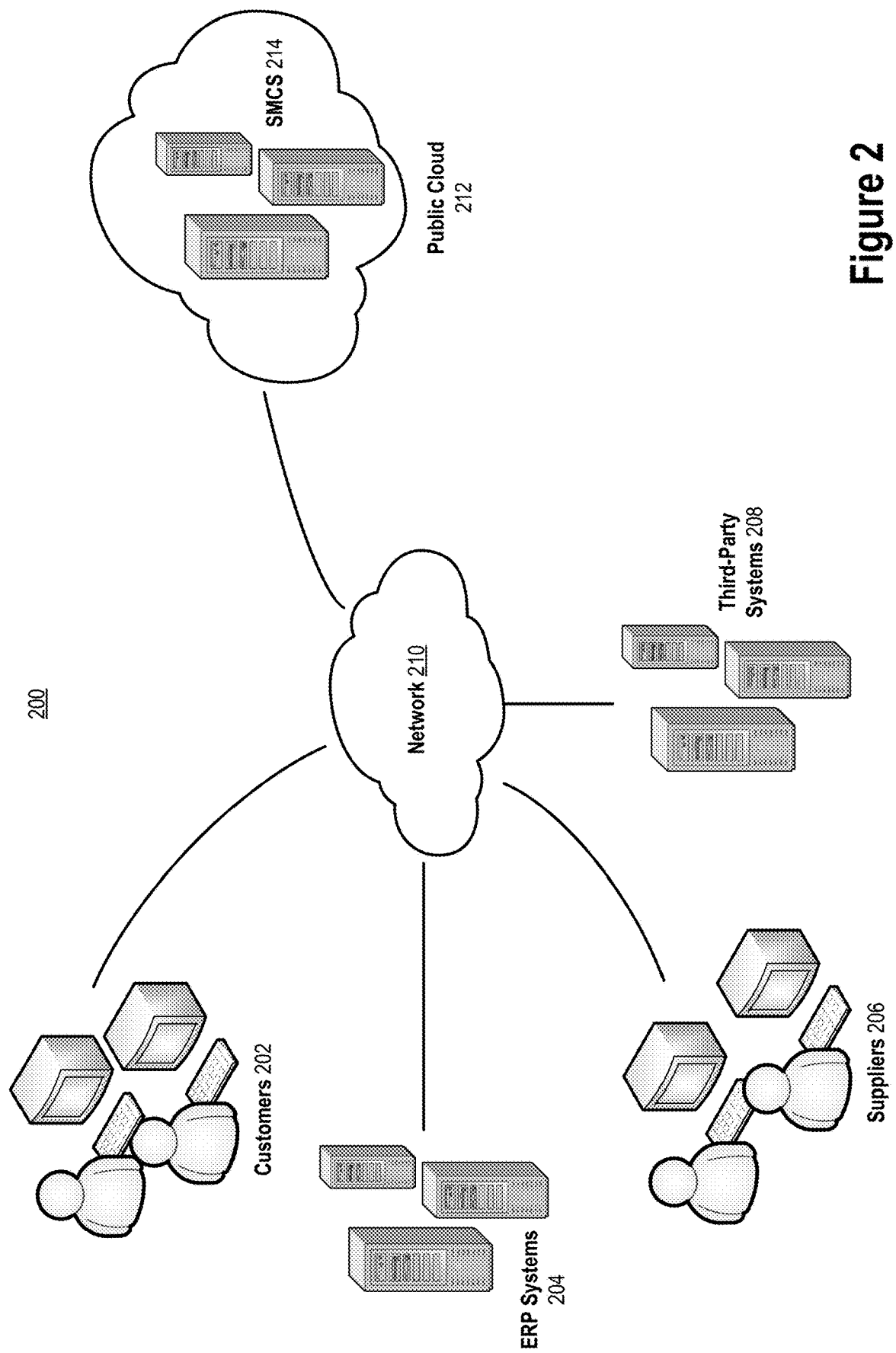
FIG. 2 is a schematic diagram of a software as a service computing environment in which techniques for community-based spend analysis in a software as a service computing environment may be embodied.

Software-as-a-Service Computing Environment for Community-Based Spend Analysis FIG. 2 is a schematic diagram of a software as a service computing environment 200 in which techniques for community-based spend analysis in a software as a service computing environment may be embodied. Environment 200 includes customers 202 with their respective personal computer systems, enterprise resource planning (ERP) computer systems 204, suppliers 206 and their respective personal computer systems, third-party computer systems 208, data communications network 210 (e.g., the public internet), and public cloud 212 hosting spend management cloud service (SMCS) 214.

Generally, SMCS 214 provides business spend management services to customers 202 of suppliers 204. Such services may include collecting, cleansing, classifying and analyzing spend data for the purpose of decreasing procurement costs, improving efficiency and monitoring compliance. Other purposes of using SMCS 214 may include inventory management, budgeting and planning and product development. Each customer 202 may be a business, organization, corporation, school, governmental agency, or other entity. Each customer 202 may have one or more user accounts with which users (e.g., employees) of the customer 202 can authenticate and access SMCS 214 over network 210.

At a high-level, customers 202 may use SMCS 214 for analysis of their spend data. Customers 202 may include buyers, sourcing managers, sourcing administrators, supplier managers or other spend or procurement administrators of businesses. Spend data may encompass requisitions (both submitted and approved), invoices, and purchase orders. The goal of conducting spend analysis using SMCS 214 may be to answer crucial questions affecting business spend, including: What is business purchasing? Who is the business purchasing from? Is the business getting what has been promised for that send? Customers 202 may use SMCS 214 to conduct other spend management activities, including for example commodity management and strategic sourcing. By using SMCS 214 to conduct spend management activities, customers 202 can improve their business profitability, improve regularity compliance, reduce cycle times, discover new areas of savings through supplier consolidation and supplier diversification, and retain past areas of savings that they have already negotiated.

Customers 202 use their personal computers to interact with SMCS 214 over network 210 according to one or more online interaction protocols. The personal computers can include desktop computers, laptop computers, tablet computers, mobile phones, or like personal computing devices. The online interaction protocol(s) may be supported by both a client application that executes at the personal computers of the customers 202 and a server application that executes at one or more server computers that host the SMCS 214. For example, the client application and the server application may exchange data over network 210 using the HTTP/S networking protocol. The data exchanged may be formatted in a variety of different ways including for example as HTML, CSS, Javascript, XML, JSON, etc. The client application may be an industry-standard web browser application or a mobile application, for example. SMCS 214 may cause particular graphical user interfaces (e.g., web pages with particular content) to be displayed by the client applications at the personal computers of the customers 202 by using the online interaction protocol(s) and network 210 to send information to the personal computers of the customers 202 for processing by the client applications. Customers 202 may interact with SMCS 214 by directing user input (e.g., keyboard, pointing device or touch input) to the graphical user interfaces, thereby causing the client applications to use the online interaction protocol(s) to send information over network 210 to SMCS 214 for processing by SMCS 214. Suppliers 204 may likewise use their personal computers to interact with SMCS 214 over network 210 according to the online interaction protocol.

SMCS 214 may be hosted in public cloud 212. Public cloud 212 may include computing services offered by third-party providers over the public internet (e.g., network 210), making them available to anyone who wants to use or purchase them. The computing services may be sold on-demand, allowing the SMCS 214 provider to pay only per usage for the CPU cycles, storage or bandwidth consumed. Even though the provider of SMCS 214 may not also provide the public cloud 212 computing services, the SMCS 214 provider may still be responsible for management and maintenance of the SMCS 214 within the public cloud 212, including putting the SMCS 214 in service on network 210.

Customers 202 may integrate ERP systems 204 and third-party systems 208 with SMCS 214 via network 210. The purpose of the integration may be to import spend data into and export send data from SMCS 214. Spend data imported into SMCS 214 from ERP systems 204 and third-party systems 208 may be processed by applications of the SMCS 214 including an application that implements techniques for community-based spend analysis in a software as a service computing environment. The integration over network 210 may be accomplished using one or more spend data integration protocols. One possible integration protocol is using flat files uploaded to and downloaded from a secure file transfer protocol (SFTP) server operated by the SMCS 214 provider. The flat files may be CSV files, for example, that contain spend data. Another possible integration protocol for importing/exporting spend data is using a REST API offered by servers of the SMCS 214. For example, the flat file integration protocol may be used for bulk import and export of spend data, and the REST API integration protocol may be used for real-time import and export of spend data.

The general types of data imported into SMCS 214 from ERP systems 204 and third-party systems 208 may include master data and transactional data (also referred to as spend data herein.) Master data may include general ledger account codes, supplier information, exchange rate information, budget line information, and user information. Transactional data (i.e., spend data) may include requisitions, purchase orders, invoices, approved invoices, receipts, purchase order revisions, invoice voids, credit memos, invoice payments and expenses. Some types of information may be only imported from ERP systems 204 and third-party systems 208 into SMCS 214 (e.g., general ledger account codes, user information, payments), some types of information only exported from SMCS 214 to ERP systems 204 and third-party systems 208 (e.g., purchase orders and receipts), and some types of information both imported and exported between SMCS 214 and ERP systems 204 and third-party systems 208 (e.g., supplier information and invoices.) Transactional data may be imported and exported more frequently than master data. For example, transaction data may be import or exported between SMCS and an ERP system 204 or a third-party system 208 on an hourly basis while master data may be imported or exported between those systems on a daily basis. ERP systems 204 may include ERP software as a service systems (e.g., NetSuite™) and more traditional ERP systems (e.g., SAP™ Oracle™, Great Plains™, etc.). Third-party systems 206 may include non-ERP systems that provide or use spend data including for example, accounts payable systems (e.g., Scan One™) invoicing systems, corporate credit card systems, and data warehouse systems.

Example Procure-to-Pay Process

Figure 3:
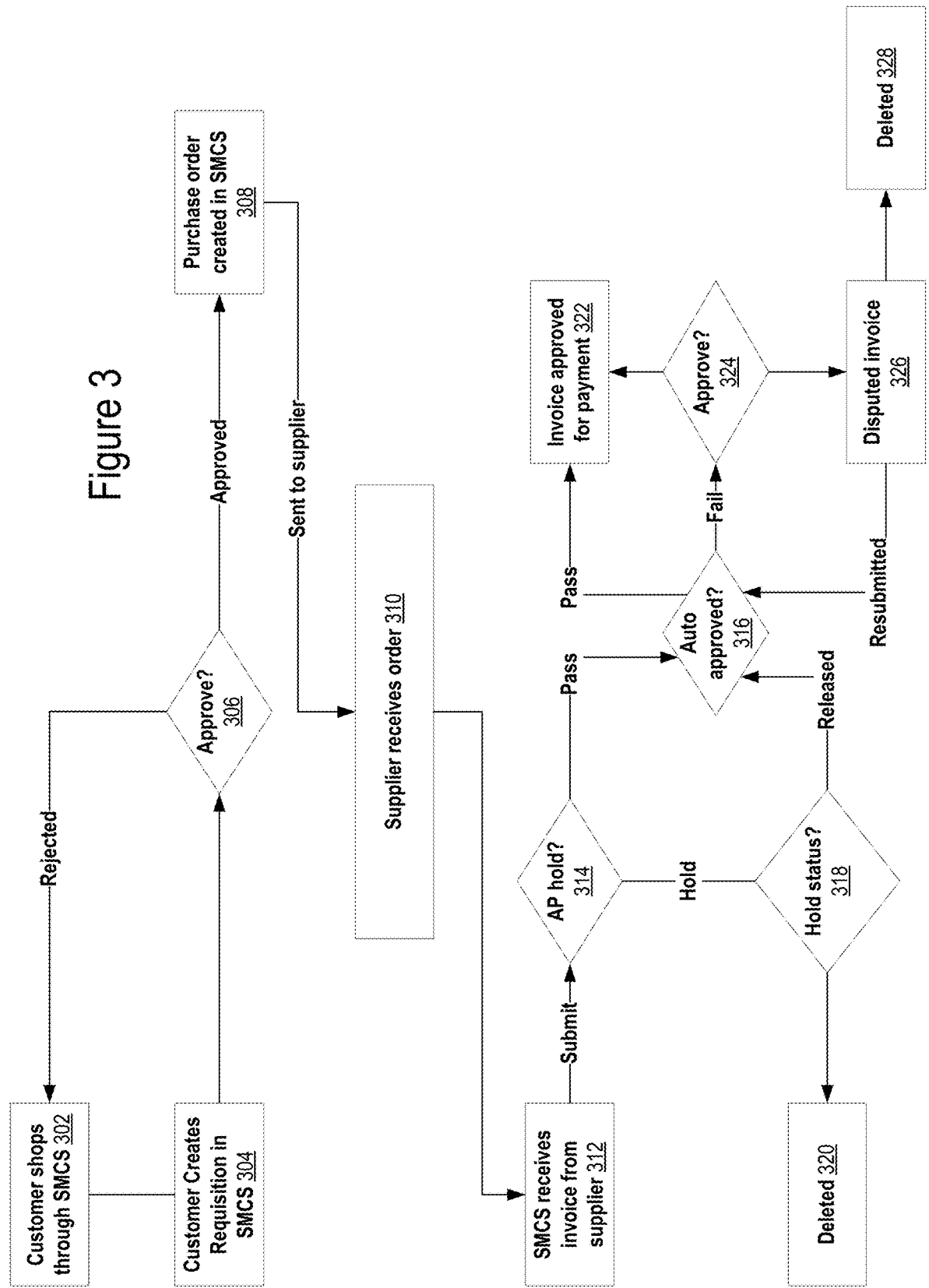
FIG. 3 is a flowchart of a procure-to-pay process that may be provided to customers and suppliers as an application feature of a spend management cloud service in a software as a service computing environment.

In addition to importing spend data from ERP systems 204 and third-party systems 206, SMCS 214 may create spend data as a result of customers 204 and suppliers 206 using a procure-to-pay application feature of SMCS 214. FIG. 3 is a flowchart of a procure-to-pay process that may be provided to customers 204 and suppliers 206 as an application feature of SMCS 214.

At step 302, a customer 204 shops online through SMCS 214 for commodities the customer wishes to purchase. For example, the customer may browse or search catalogs uploaded to SMCS 214 by suppliers 206. At step 304, the customer uses the SMCS 214 to create a requisition in the SMCS 214 for one or more commodities that the customer has selected. If the requisition is approved 306, then the SMCS 214 creates 308 a purchase order in the SMCS 214 corresponding to the requisition. If the requisition is not approved, then the customer may return to shopping 302 and create 304 a new requisition.

At operation 310, a supplier 206 receives the purchase order from the SMCS 214. At operation 312, the SMCS 214 receives an invoice corresponding to the purchase order from the supplier and submits it to the customer. At operation 314, the SMCS 214 determines if there is an accounts payable hold 314 on the invoice. If so, then SMCS 214 places payment of the invoice on-hold 318 until the hold is released or the invoice is deleted 320. If there is no hold on the invoice or the invoice is released from a hold, then the SMCS 214 determines if payment of the invoice is automatically approved 316. If so, then the SMCS 214 approves the invoice for payment. If payment is not automatically approved 316, then the SMCS 214 waits for approval 324 by the customer. If the customer does not give approval 324, then the customer can use the SMCS 214 system to dispute 326 the invoice which can result in the disputed invoice being deleted 328 or resubmitted 316 for approval, possibly with modifications. On the other hand, if the customer approves 324 the invoice, then the SMCS 324 approves the invoice for payment.

The above procure-to-pay process is merely an example of one type of spend management process that SMCS 214 may aid or implement that results in the creation of spend data by the SMCS 214. Other types of spend management process that SMCS 214 may aid or implement that results in the creation of spend data by the SMCS 214 include for example sourcing (e.g., for customers 204 to run sourcing events coordinated by the SMCS 214 with suppliers 206 to save money), contract management (e.g., for customers 204 to use a contract repository provided by the SMCS 214 to access approved contracts and to leverage their negotiated pricing at the time of purchase), catalog management (e.g., for customers 204 to use as a shopping and catalog management front-end to their ERP systems 204) and expense management.

Spend Management Cloud System for Community-Based Spend Analysis

Figure 4:
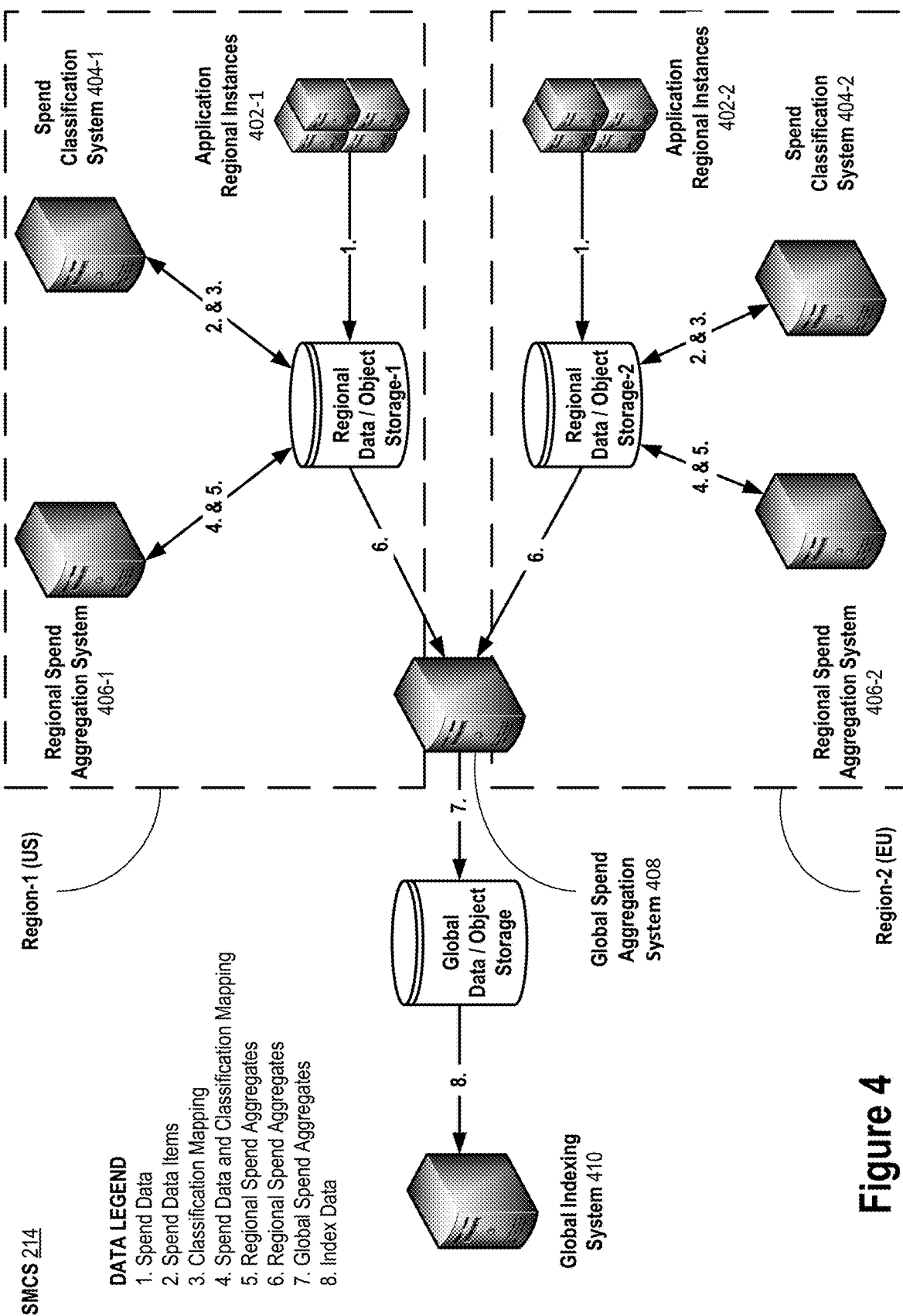
FIG. 4 is a more detailed schematic diagram of the spend management cloud service in the software as a service computing environment of FIG. 2.

FIG. 4 is a more detailed schematic diagram of the spend management cloud service 214 in the software as a service computing environment of FIG. 2. As shown, the SMCS 214 may be divided into geographic regions. While two regions are shown in FIG. 4, there may be more than two regions or only a single region in an implementation. The regions are selected based on the geographic locations of the customers 204 and suppliers 206 that use SMCS 214. For example, Region-1 may be the United States and Region-2 may be the European Union. As such, customers 204 and suppliers 206 in the United States may use the servers of SMCS 214 in Region-1 while customers 204 and supplier 206 in the European Union may use the server of SCMS 214 in Region-2. By dividing the SMCS 214 into geographic regions, the SMCS 214 can be more responsive to application requests over network 210 from customers 204 and suppliers 206 in that region.

Region-1 includes a plurality of application regional instances 402-1, a spend classification system 404-1, a regional data/object storage and regional spend aggregation system 406-1. Similarly, Region-2 includes a plurality of application regional instances 402-2, a spend classification system 404-2, a regional data/object storage and regional spend aggregation system 406-2.

Within each region are SMCS instances 402. Each SMCS instance 402 serves a particular customer 204 in that region. As mentioned, each customer 204 may hold one or more user accounts that allows users (e.g., employees) of the customer to authenticate and access their SMCS instance 402 over the network 210. Each SMCS instance 402 may include a number of servers including web servers, application servers, database servers, and other servers that provide application functionality to customers 204 and suppliers 206 of the instance.

SMCS instances 402 can be implemented in public cloud 212 using a multi-tenant architecture where a single application instance is configured to provide every tenant a separate share of the application instance including for example data, configuration, user management, etc. However, it is also possible to implement SMCS instances 402 using a multi-instance architecture where separate application instances serve different tenants.

In operation, spend data is regularly (e.g., daily or hourly) extracted, transformed and loaded from all regional SMCS instances 402 to regional data storage. The spend data may be composed of spend data lines. Each spend data line may include a text description of a commodity. For example, the text description may be a line item description from an invoice, purchase order or requisition. The invoice, purchase order or requisition may be one from which the spend data line is derived or extracted.

In some instances, in the interest of privacy, a customer 204 can voluntarily opt-out their SMCS instance 402 from participation in the community-based spend analysis. In this case, spend data obtained and created by the SMCS instance 402 is not collected at regional data storage and their spend data is not used in the community-based spend analysis. Whether a customer 204 voluntarily opts-out their SMCS instance 402 from participation in the community-based spend analysis, all spend data collected at regional data storage may be anonymized with respect to customers 204 in the interest of privacy. This anonymization may be accomplished by referring to spend data lines associated with a particular customer 204 by a message digest of unique identifier of the particular customers' 204 SMCS instance 402. In this way, spend data lines can be associated with a particular SMCS instance 402 without revealing the identity of the customer 204 of the particular SMCS instance 402.

Each spend data line may also include a monetary amount for the commodity. For example, the spend data line may specify the monetary cost or invoicing, purchasing or requisition amount for the commodity described by the text description.

A spend data line may also contain or be associated with an identifier of a supplier. The supplier may be one for example that received a purchase order from a customer via SMCS 214 or submitted an invoice to a customer via SMCS 214.

Other spend context information may include whether the spend data line was derived or extracted from an invoice, a purchase order or requisition, or otherwise indicate the type of spend transaction from which the spend data line was derived or extracted. A date or a date and time associated with the spend data line may also be part of the spend context information. The date or date and time may be derived or extracted from an invoice, purchase or requisition, for example.

Spend data lines collected and stored in regional data storage may be classified by a regional spend classification system 404. The regional spend classification system 404 may include a trained deep learning classifier. At a high-level, the trained deep learning classifier performs sequence classification using a trained long short-term memory (LSTM) recurrent neural network (RNN) with word vector representations and embedding layers (e.g., Word2Vec or the like) to predict a category for an input sequence. The trained LSTM/RNN is adept at handling a very large vocabulary of input symbols that requires the LSTM/RNN to learn long-term context of dependencies between symbols in the input sequence. The LSTM/RNN may be trained based on actual or synthetically generated spend data lines with corresponding spend category labels. The spend category labels may be standard commodity categories, or codes therefore, from a standard taxonomy of commodities such as one of those mentioned in the next paragraph.

Once trained, the regional spend classification system 404 classifies spend data lines stored in regional data storage in a set of standard spend categories where each standard spend category represents a standard category of spend (e.g., "furniture and furnishings," "software," "telecom services," "office equipment," etc.) according to a standard taxonomy of commodities. For example, the set of standard spend categories may be from the United Nations Standard Products and Services Code (UNSPSC), the Common Procurement Vocabulary (CPV), the GS1 Global Product Classification (GPC), or the set of eCl@ss code.

The standard taxonomy of commodities may be hierarchical. For example, the foregoing standard taxonomy systems each have four hierarchical classification levels from more general to more specific respectively and named as follows:

TABLE 1

| Standard Taxonomy System | Hierarchical Levels |
| --- | --- |
| UNSPSC | Level 1 (most general) → Segment |
|  | Level 2 → Family |
|  | Level 3 → Class |
|  | Level 4 (most specific) → Commodity |
| CPV | Level 1 (most general) → Divisions |
|  | Level 2 → Groups |
|  | Level 3 → Classes |
|  | Level (most specific) → Categories |
| GPC | Level 1 (most general) → Segment |
|  | Level 2 → Family |
|  | Level 3 → Class |
|  | Level 4 (most specific) → Brick |
| eCl@ss | Level 1 (most general) → Segments |
|  | Level 2 → Main Groups |
|  | Level 3 → Groups |
|  | Level 4 (most specific) → Commodity Classes |

The regional spend classification system 404 may classify spend data lines from regional data store into a particular hierarchical level of a standard taxonomy system. The particular hierarchical level may be one that is above the individual commodity level so as to provide a high-level categorization of individual commodities. For example, the particular hierarchical level may be family level of the UNSPCS, the groups level of the CPV, the family level of the GPC, or the main groups level of the eCl@ss. However, it is also possible to classify spend data lines at other levels (e.g., at the segment, family, class and commodity level of the UNSPSC) or at all levels from the most general level to the most specific level.

For example, the regional spend classification system 404 may obtain a spend data line from a purchase order with a text description of a commodity such as for example "Ball End Hex Key Set Measurement Type SAEMetric Handle Type L-Shaped Arm Type Long Blade Material Chrome Vanadium Steel Fish Chrome Plated Number of Pieces 22 Arm Length 2.80 to 8.80 in. Sizes included 0.050 116 564 332 764 18 964 532 316 732 14 516 38." After extracting nouns verbs and adjectives from the text description, those features may be classified together by the regional spend classification system 404 in the following UNSPSC hierarchy levels:

TABLE 2

| UNSPSC Hierarchy Level | Standard Spend Category |
| --- | --- |
| Commodity | "Hex keys" |
| Class | "Wrenches and drivers" |

TABLE 2-continued

| UNSPSC Hierarchy Level | Standard Spend Category |
|---|---|
| Family | "Hand tools" |
| Segment | "Tools and general machinery" |

In a similar way, all spend data lines in regional data storage may be classified by regional spend classification system 404 in standard spend categories. The regional spend classification system 404 may do this on a continuous or periodic basis (e.g., hourly or daily) for example as new spend data lines are received from the regional SMCS instances 402 and stored in the regional data storage. As a result, the regional spend classification system 404 may store or update a classification mapping at regional data store. The classification mapping maps classified spend data lines to one or more standard spend categories. The classification mapping may be stored and maintained at the regional data storage.

Regional spend aggregation system 406 may use the classification mapping stored at the regional data storage to periodically aggregate spend data lines stored at the regional data storage on an aggregation interval based on standard spend categories. The aggregation interval may be hourly or daily, for example. On the aggregation interval, the regional spend aggregation system 406 may compute per-SMCS instance-based and community-based spend aggregates based on new spend data that has not been aggregated since the prior aggregation interval. For example, the regional spend aggregation system 406 may compute spend aggregates hourly or daily based on the past hour's or past day's spend data collected at the regional data storage. On the aggregation interval or on a longer periodic interval, the regional spend aggregation system 406 may "roll-up" spend aggregates computed on the aggregation interval into spend aggregates covering longer intervals of time. For example, hourly spend aggregates may be rolled-up to daily spend aggregates, and those daily spend aggregates rolled-up to monthly spend aggregates, and so on. According to some techniques, the regional spend aggregation system 406 computes a rolling window of monthly spend aggregates for the past twelve months.

Regional spend aggregation system 406 may compute a variety of different spend aggregates. According to some techniques, the following community-based spend aggregates are computed from a set of spend data lines at regional data storage. The set of spend data lines may be from spend data collected from a plurality (a community) of regional SMCS 402 instances. The aggregates may be computed from the set of spend data lines for each distinct unordered combination of supplier and Level 2 standard spend category in the set of spend data lines. The Level 2 standard spend category may be the family level of the UNSPSC, for example.

TABLE 3

| Community Aggregate | Description |
|---|---|
| Number of Distinct Individual Commodities Per Family Spend Category Per Supplier. | The number of distinct Level 4 standard spend categories in which the set of spend data lines in the Level 2 standard spend category for the supplier are classified. The Level 4 standard spend category may be the commodity level of the UNSPCS, for example. |

TABLE 3-continued

| Community Aggregate | Description |
|---|---|
| Number of Distinct Customers Per Family Spend Category Per Supplier. | The number of distinct customers in the set of spend data lines in the Level 2 standard spend category for the supplier. |

According to some of the techniques, the following additional community spend aggregates are computed by the regional spend aggregation system 406 from a set of spend data lines at regional data storage. The set of spend data lines may be from spend data collected from a plurality (a community) of regional SMCS 402 instances. The aggregates may be computed from the set of spend data lines for each distinct unordered combination of supplier, Level 2 standard spend category, customer industry, and spend transaction type in the set spend data lines. The Level 2 standard spend category may be the family level of the UNSPSC, for example. The customer industry may be selected from a predefined set of high-level industry categories such as for example the set of top-level industry groups of the standard industrial classification (SIC) system or the set of top-level business sectors of the North American Industry Classification System (NAICS), or the like, or a subset, or a superset thereof. The spend transaction type may be one of invoice, purchase order or requisition.

TABLE 4

| Additional Community Aggregates | Description |
|---|---|
| Average Per-Customer Spend Amount. | The average per customer spend amount in the set of spend data lines for the supplier, the Level 2 standard spend category, the customer industry, and the spend transaction type. |
| Average Per-Customer Spend Transaction Count. | The average per customer number of spend transactions in the set of spend data lines for the supplier, the Level 2 standard spend category, the customer industry, and the spend transaction type. |

According to some of the techniques, the following additional per-instance spend aggregates are computed by the regional spend aggregation system 406 from a set of spend data lines at regional data storage. The set of spend data lines may be from spend data collected from a particular regional SMCS instance 402 (as opposed to from a community of regional SMCS instances 402.) These per-instance aggregates may be computed from the set of spend data lines for each distinct unordered combination of supplier, Level 2 standard spend category, customer industry, and spend transaction type in the set spend data lines.

TABLE 5

| Per-Instance Aggregates | Description |
|---|---|
| Total Spend Amount. | The total spend amount in the set of spend data lines for the supplier, the Level 2 standard spend category, the customer industry, and the spend transaction type. |
| Total Spend Transaction Count. | The total number of spend transactions in the set of spend data lines for the supplier, the Level 2 standard spend category, the customer industry, and the spend transaction type. |

In the above, if customers are anonymized in the region spend data, then the regional SMCS 402 instances may be used as a proxy. For example, instead of computing the average-per customer spend amount, the average per-instance spend amount may be computed instead.

Further, instead of computing an average as in, for example, an average per-customer spend amount, a mean, median, mode or midrange many be computed instead. Alternatively, one of more these aggregates may be computed in addition to the average.

Global spend aggregation system 408 may aggregate regional spend aggregates computed by the regional spend aggregation system 406 including commodity aggregates (Numbers of Distinct Individual Commodities Per Family Spend Category Per Supplier, Numbers of Distinct Customers Per Family Spend Category Per Supplier), the additional community aggregates (Average Per-Customer Spend Amounts, Average Per-Customer Spend Transaction Counts) and the per-instance aggregates (Total Spend Amounts, Total Spend Transaction Counts). The global spend aggregates may be stored in global data/object storage where they are used to build and maintain indices by global indexing system 410. The indexes are used to efficiently provide configurable community-based spend analysis in graphical user interfaces to customers 204 at their personal computing devices. To do this, customers 204 may send requests for community-based spend analysis over network 210 to their respective regional SMCS instances 402 which in turn access the indexes at global indexing system 410 to obtain the information of the requested community-based spend analysis for transmission over network 210 to the customers' 204 personal computers for presentation in graphical user interfaces at the customers' 204 personal computers. Example graphical user interfaces for community-based spend analysis are described below with respect to certain figures of the drawings.

Indexing for Community-Based Spend Analysis

Figure 5:
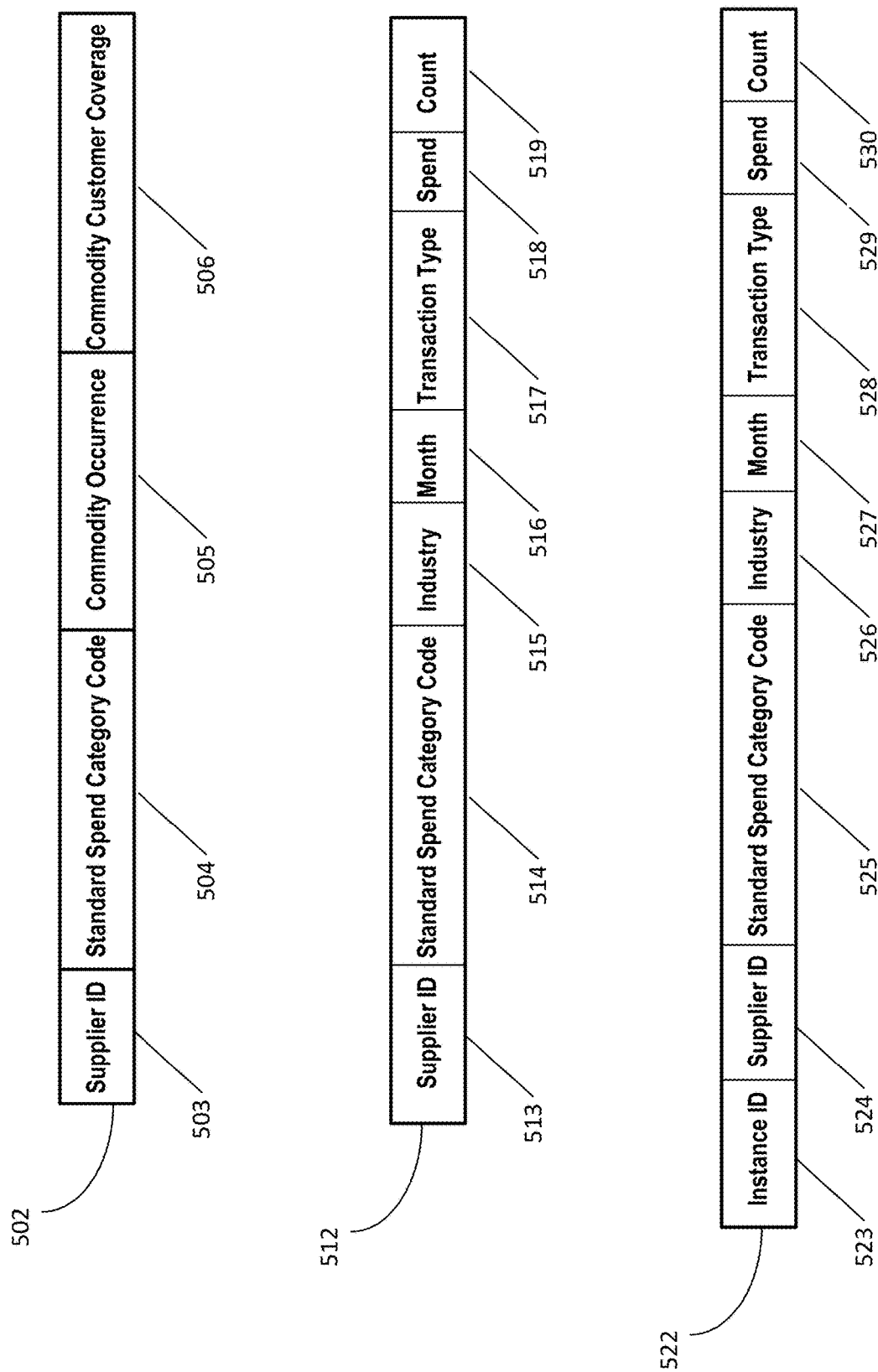
FIG. 5 is a schematic diagram of index entries for efficiently conducting community-based spend analysis.

FIG. 5 is a schematic diagram of index entries for efficiently conducting community-based spend analysis. As shown, there are three different types of entries for three different indexes. The first index contains entries 502, the second index contains entries 512, and the third index contains entries 522.

The first index may be used to efficiently look up the "Number of Distinct Individual Commodities per Family Spend Category per Supplier" global community aggregate and for efficiently looking up the "Number of Distinct Customers per Family Spend Category per Supplier" global community aggregate for a given supplier and family standard spend category. The first index is also useful for efficiently aggregating over the Number of Distinct Individual Commodities per Family Spend Category per Supplier global community aggregates for a given supplier, or for efficiently aggregating over the Number of Distinct Customers per Family Spend Category per Supplier global community aggregates for a given supplier. Each entry 502 of the first index has a field 503 for the supplier id, a field 504 for the standard spend category code (e.g., a code from the family level of the UNSPSC), a field 505 for the Number of Distinct Individual Commodities per Family Spend Category per Supplier global community aggregate computed by the global aggregation system 408 for the supplier 503 and standard spend category 504 of the entry 502, and a field 506 for the "Number of Distinct Customers per Family Spend Category per Supplier" global community aggregate computed by the global aggregation system 408 for the supplier 503 and standard spend category 504 of the entry 502.

The second index may be used to efficiently look up the "Average Per-Customer Spend Amount" global community aggregate and for efficiently looking up the "Average Per-Customer Spend Transaction Count" global community aggregate for a given supplier, family standard spend category, a customer industry, a month, and a transaction type. The second index is also useful for aggregating those global community aggregates for a given supplier and one or more but less than all of a family standard spend category, a customer industry, a month, and a transaction type. Each entry 512 of the second index has a field 513 for the supplier id, a field 514 for the standard spend category code (e.g., a code from the family level of the UNSPSC), a field 515 for the customer industry, a field 516 for the month, a field 517 for the transaction type, a field 518 for the Average Per-Customer Spend Amount global community aggregate, and a field 519 for the Average Per-Customer Spend Transaction Count global community aggregate.

The third index is like the second index but for the Total Spend Amount per-instance aggregates and the Total Spend Transaction Count per-instance aggregates. Each entry 522 of the third index has a field 523 for the instance id, a field 524 for the supplier id, a field 525 for the standard spend category code (e.g., a code from the family level of the UNSPSC), a field 526 for the customer industry, a field 527 for the month, a field 528 for the transaction type, a field 529 for the Total Spend Amount instance aggregate, and a field 530 for the Total Spend Transaction Count instance aggregate.

Community-Based Spend Analysis in Multiple Spend Categories

Figure 6:
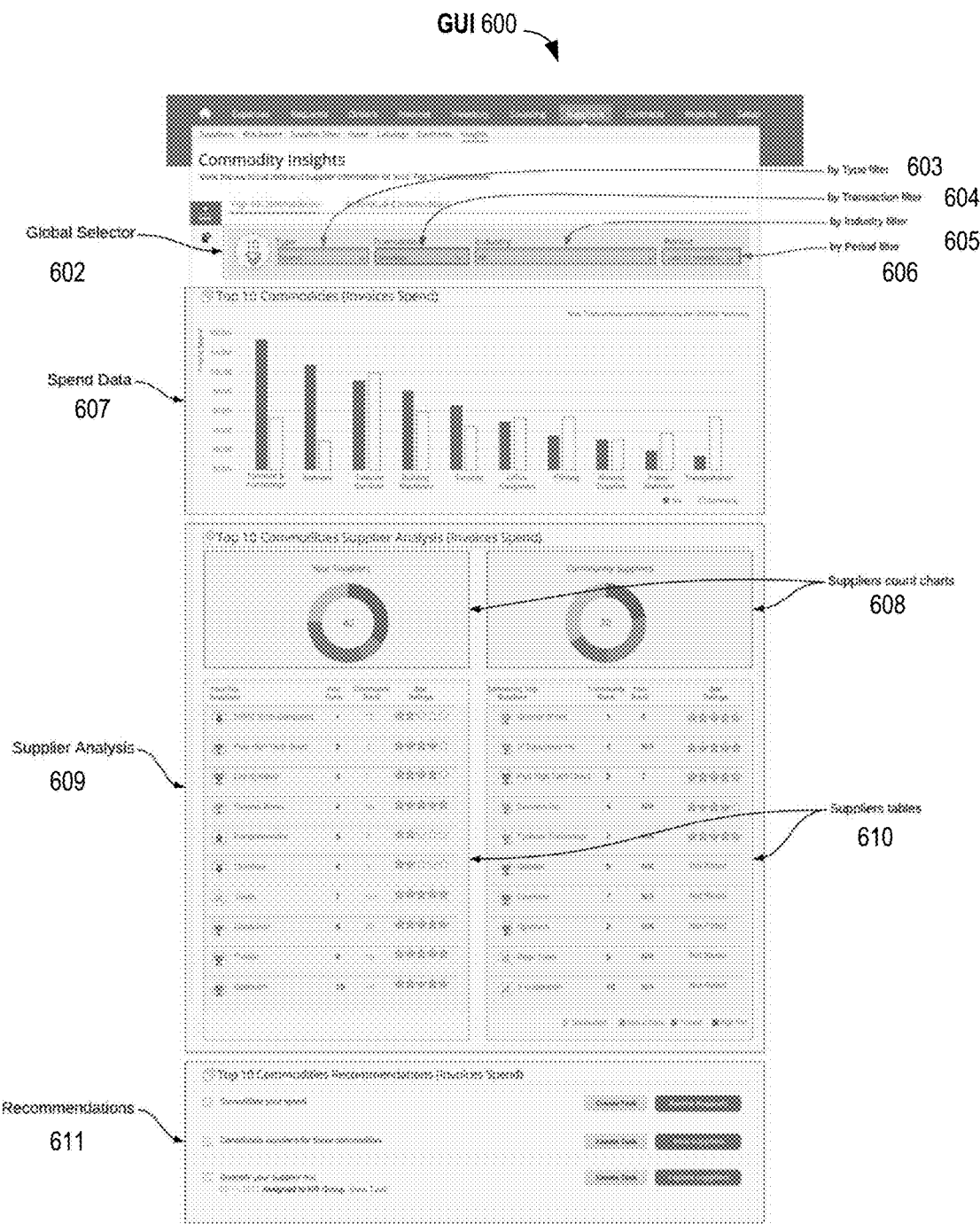
FIG. 6 depicts an example graphical user interface for community-based spend analysis in a plurality of spend categories.

FIG. 6 depicts an example graphical user interface 600 for community-based spend analysis across a plurality of top spend categories. The GUI 600 provides a global selector 602 with user interface controls (e.g., drop-down selection lists) to the user for selecting what information is displayed below the global selector 602. The GUI 600 may be presented to a particular customer 204 at a personal computing device of the particular customer 204 after the particular customer 204 has successfully authenticated with a user account associated with the particular customer's 204 regional SMCS instance 402. The particular customer 204 may use the global selector 602 to configure/filter the spend analysis that is displayed in the GUI 600.

For conducting spend analysis, the global selector 602 provides four filters for filtering the information that is included in the displayed spend analysis.

The type filter 603 selects whether spend or count aggregates are included in the displayed spend analysis. In this example, spend aggregates are selected. Generally, a spend aggregate is an aggregate of spend amounts. For example, in GUI 600, the total invoice spend by the particular customer during the selected period across all industries in the "Furniture & Furnishings" standard spend category is between $110,000 and $120,000, while the average invoice spend in the community during the same period across industries in the same standard spend category is between $70,000 and $80,000. Both the total invoice spend (SUM) by the particular customer and the average invoice spend in the community (AVERAGE) are spend aggregates. A count aggregate is an aggregate of a number of spend transactions of a particular type. For example, a count aggregate may be a count of a number of invoices paid by a particular customer during a period of time across all or selected industries, or an average number of invoices paid by a community of customers during the period of time across all or the selected industries.

By default, all spend transaction types are included. The transaction filter 604 may be used to limit the spend transaction types that are included to one of invoices, purchase orders, purchase requisitions, or expense reports. In this example, the spend analysis is limited to invoices.

The industry filter 605 may be used to limit the industry of the spend analysis from the default of including all industries. The industry filter 605 is useful for selecting a community of customers for the spend analysis that are in the same industry as the particular customer.

Finally, the period filter 606 may be used to limit the time period of the spend analysis. In this example, the time period of the spend analysis is limited to the past twelve months. Other selectable options may include for example the past month, the past two months, the past three months, or other selected range of time.

Based on the selections by the particular customer in the global selector 602, the spend data panel 604 includes a bar graph that charts invoice spend for a set of top ten standard spend categories for the particular customer according to invoice spend. For each of the top ten standard spend categories, a comparison against average invoice spend for the community for the standard spend category is provided. For example, from spend data panel 604, the particular customer can see that the average per-customer invoice spend for the community in the past twelve months for software was more than the invoice spend by the particular customer for software.

Based on the selections by the particular customer in the global selector 602, two supplier count charts 608 are also provided. One chart specifies the number of distinct suppliers associated with invoice spend by particular customer in the past twelve months in the top ten standard spend categories. The other chart specifies the average number of distinct suppliers per customer in the community associated with invoice spend in the past twelve months in the top ten invoice standard spend categories. From the supplier count chart 608, the particular customer can see that they used more suppliers in the past twelve months for the top ten standard spend categories for invoice spend than customers in the community did on average.

Based on the selections by the particular customer in the global selector 602, two supplier tables 610 are provided in the GUI 600. One table lists the top ten suppliers in terms of invoice spend by the particular customer in the past twelve months for the top ten standard spend categories according to invoice spend. The other table lists for comparison the top ten suppliers in terms of average invoice spend per customer in the community in the past twelve months for the top ten standard spend categories according to invoice spend.

Finally, GUI 600 provides recommendations 611 for spend optimization. The recommendations 611 displayed are automatically selected according to a recommendation rule set. Each recommendation 611 is accompanied with user interface controls in the GUI 600 which the particular customer can invoke to begin a respective spend optimization process.

Note that while in the above example GUI 600, the spend data under spend analysis is for ten standard spend categories, the spend data under spend data analysis could be for more the ten standard spend categories or for as few as a single selected standard spend category.

Community-Based Spend Analysis in a Single Spend Category

Figure 7:
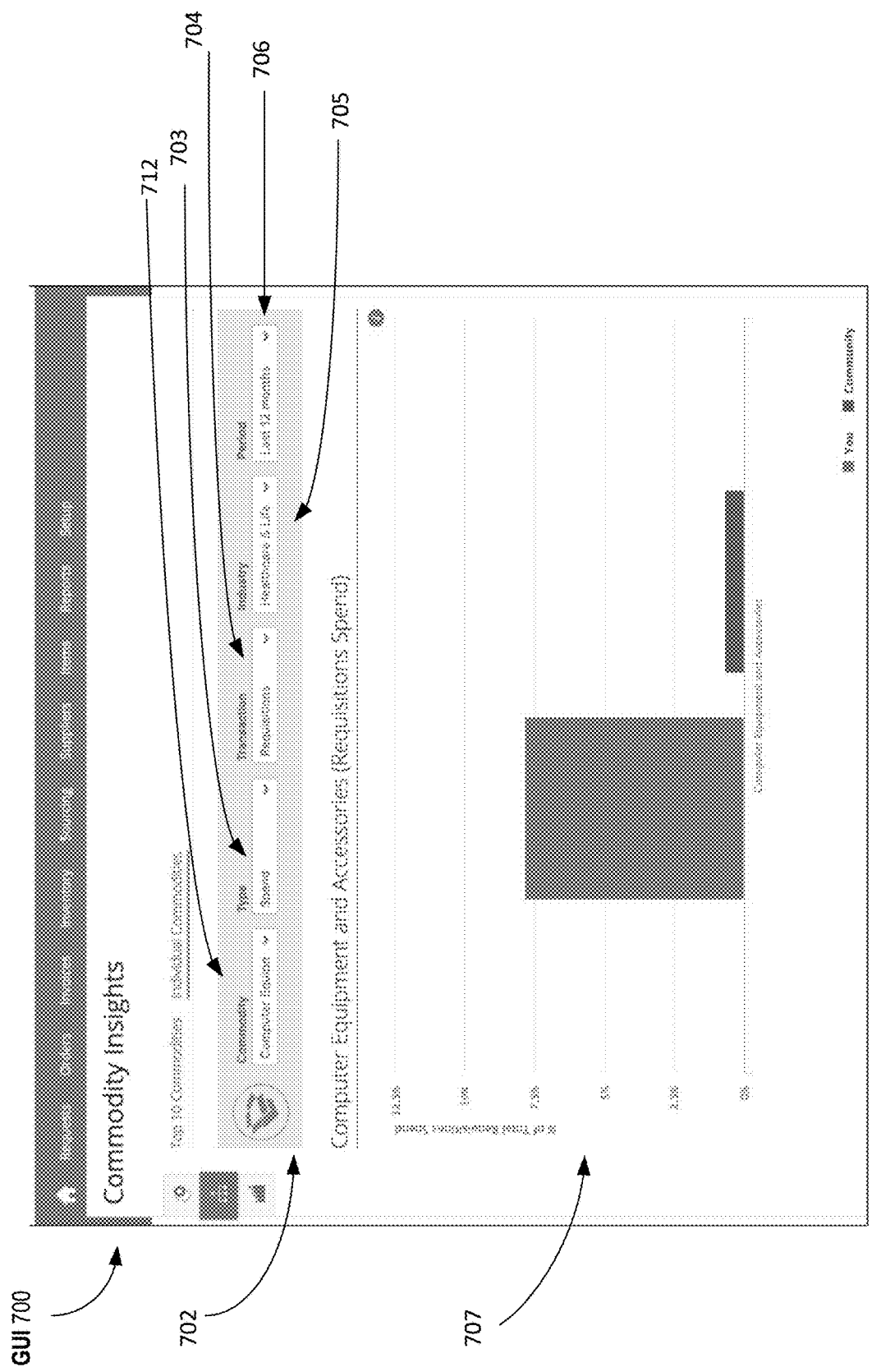
FIG. 7 depicts an example graphical user interface for community-based spend analysis in a selected individual spend category.

FIG. 7 depicts an example graphical user interface 700 for community-based spend analysis in a single selected spend category. The GUI 700 provides a global selector 702 with user interface controls (e.g., drop-down selection lists) to the user for selecting what information is displayed below the global selector 702 in the chart area 707.

The GUI 700 may be presented to a particular customer 204 at a personal computing device of the particular customer 204 after the particular customer 204 has successfully authenticated with a user account associated with the particular customer's 204 regional SMCS instance 402. The particular customer 204 may use the global selector 702 to configure/filter the spend analysis that is displayed in the GUI 700.

For conducting spend analysis, the global selector 702 provides five filters for filtering the information that is included in the displayed spend analysis 707.

The commodity filter 712 selects a single standard category for the displayed spend analysis 707 from among a plurality of standard spend categories available for selection. In this example, the "Computer Equipment and Accessories" standard spend category is selected.

The type filter 703 selects whether spend or count aggregates are included in the displayed spend analysis 707. In this example, spend aggregates are selected.

By default, all spend transaction types are included. The transaction filter 704 may be used to limit the spend transaction types that are included in the displayed spend analysis 707 to one of invoices, purchase orders, purchase requisitions, or expense reports. In this example, the spend analysis is limited to purchase requisitions.

The industry filter 705 may be used to limit the industry of the displayed spend analysis 707 from the default of including all available industries. The industry filter 705 is useful for selecting a community of customers for the spend analysis that are in the same industry as the particular customer.

Finally, the period filter 706 may be used to limit the time period of the spend analysis. In this example, the time period of the spend analysis is limited to the past twelve months. Other selectable options may include for example the past month, the past two months, the past three months, or other selected range of time.

Based on the selections by the particular customer in the global selector 702, the displayed spend analysis 707 includes a bar graph that charts purchase requisition spend for a single spend category by the particular customer during the past twelve months. A comparison against average purchase requisition spend in the standard spend category by the community during the past twelve months is also provided. For example, from displayed spend analysis 707, the particular customer can see that the average per-customer purchase requisition spend by the community for computer equipment and accessories in the past twelve months was less than 2.5% of the total per-customer purchase requisition spend by the community in the past twelve months, while the particular customer's purchase requisition spend for computer equipment and accessors in the past twelve months was over 7.5% of the total purchase requisition spend by the particular customer in the past twelve months.

Figure 8:
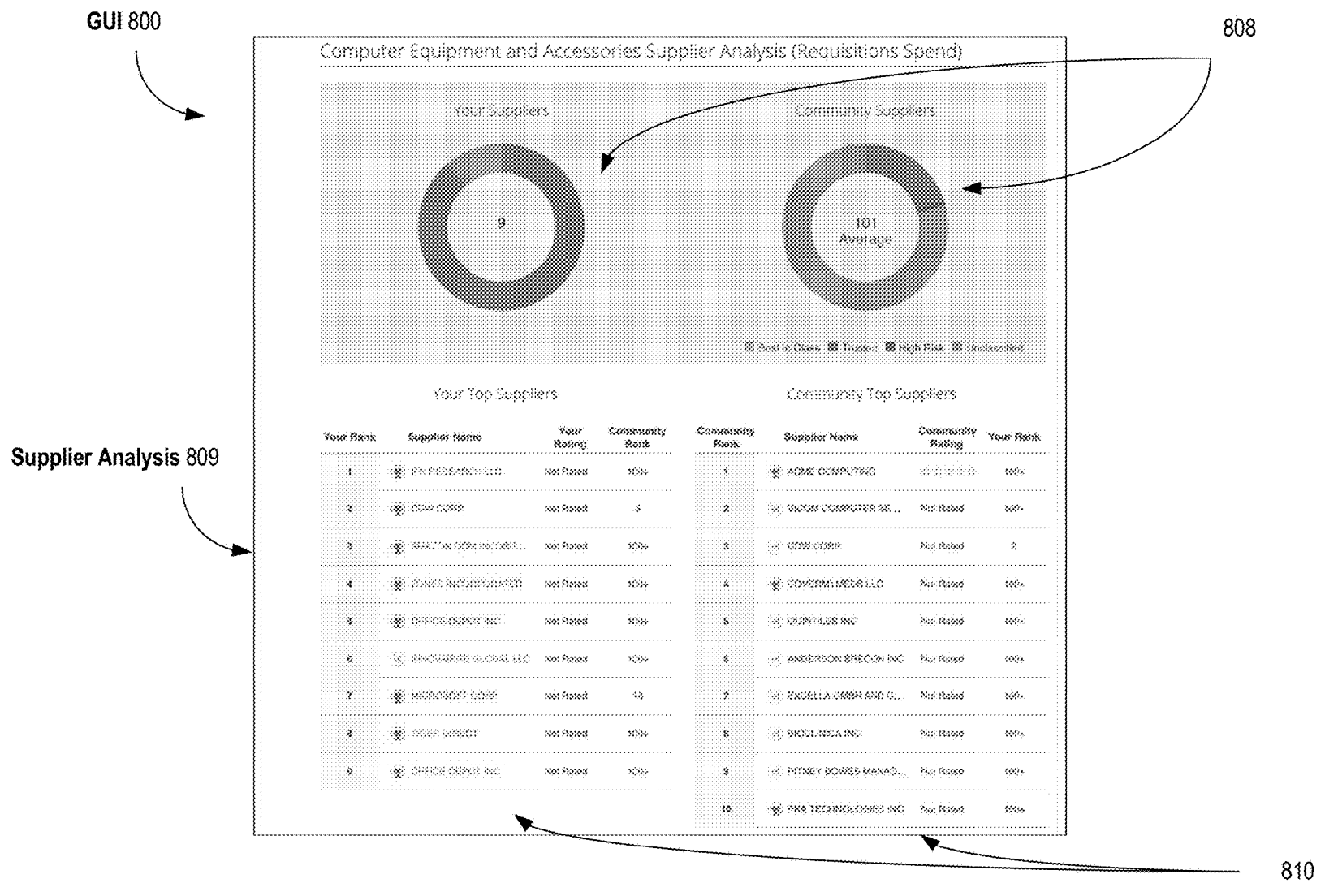

As depicted in GUI 800 of FIG. 8, based on the selections by the particular customer in the global selector 802, two supplier count charts 808 are also provided. One chart specifies the number of distinct suppliers associated with purchase requisition spend by particular customer in the past twelve months for the selected "Computer Equipment and Accessories" standard spend category. The other chart specifies the average number of distinct suppliers per customer in the community associated with purchase requisition spend in the past twelve months for the selected "Computer Equipment and Accessories" standard spend category. From the supplier count chart 808, the particular customer can see that they used far fewer suppliers in the past twelve months for the selected "Computer Equipment and Accessories" spend category for purchase requisition spend than customers in the community did on average.

Based on the selections by the particular customer in the global selector 802, two supplier tables 810 are provided in the GUI 800. One table lists the top suppliers in terms of purchase requisition spend by the particular customer in the past twelve months for the selected "Computer Equipment and Accessories" spend category. The other table lists for comparison the top suppliers in terms of average purchase requisition spend per customer in the community in the past twelve months for the selected "Computer Equipment and Accessories" spend category. The suppliers in the tables 810 are also associated with customer and community ratings, respectively, so that the particular customer can compare the customer's ratings to the community's average ratings. For example, from tables 810, the particular customer can see that the top supplier for the particular customer "IFN RESEARCH LLC" has relatively low average ranking in the community. From this, the particular customer may decide to switch to a higher rated supplier such as, for example, "AMCE COMPUTING" listed as the top-rated supplier for the standard spend category by the community.

Figure 9:
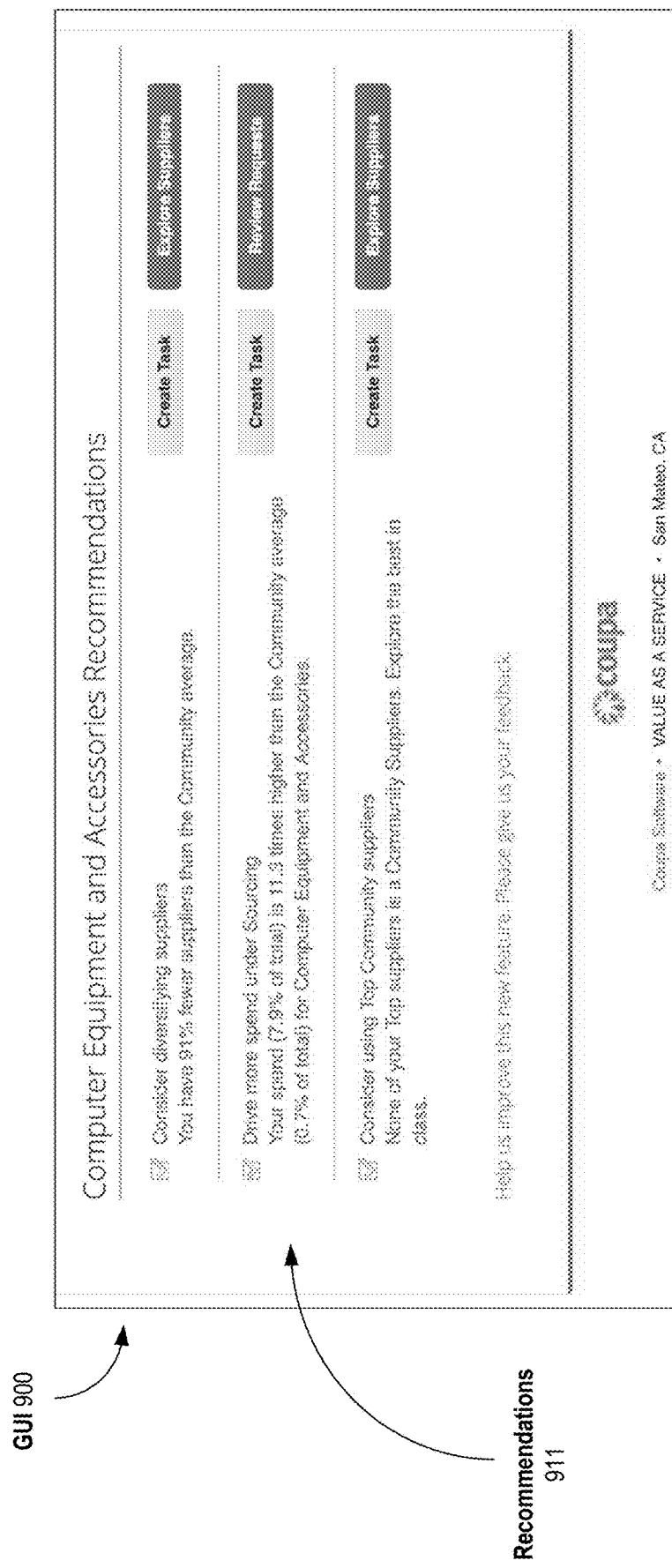
FIG. 9 depicts an example graphical user interface for community-based spend analysis in a selected individual spend category.

As depicted in GUI 900 of FIG. 9, recommendations 911 are provided for spend optimization. The recommendations 911 displayed are automatically selected according to a recommendation rule set. Each recommendation 911 is accompanied with user interface controls in the GUI 900 which the particular customer can invoke to begin a respective spend optimization process.

While in the embodiments of FIG. 6, FIG. 7, and FIG. 8, a bar chart is used to compare a particular customer's spend against the spend of the community, other types of charts may be used for the comparison including, but not limited to, a column chart, a Mekko chart, a pie chart, a line chart, a scatter plot chart, a bullet chart, etc.

Community-Based Spend Optimization Recommendations

According to some of the techniques, different recommendation types are possible, each having their own respective recommendation rule that governs when the recommendation is made to a particular customer in a graphical user interface (e.g., GUI 600 or GUI 900) The recommendations may be based on the spend data selected by the particular customer using the global selector (e.g., 602 or 702).

One type of recommendation recommends that the particular customer should consider diversifying suppliers. This recommendation may be triggered when the number of distinct suppliers for the particular customer is less than one-half (or other suitable threshold) the number of distinct suppliers on average in the community according to the spend data selected by the particular customer using the global selector (e.g., 602 or 702).

Another type of recommendation recommends that the particular customer should consider consolidating suppliers. This recommendation may be triggered when the number of distinct suppliers for the particular customer is greater than one and one-half (or other suitable threshold) the number of distinct suppliers on average in the community according to the spend data selected by the particular customer using the global selector (e.g., 602 or 702).

Yet another type of recommendation recommends that the particular customer should drive more spending using a sourcing feature of the SMCS 214. This recommendation may be triggered when the requisition spend amount is greater than one and one-half (or other suitable threshold) the average requisition spend amount per customer in the community according to the spend data selected by the particular customer using the global selector (e.g., 602 or 702).

Yet another type of recommendation recommends that the particular customer should drive more spending using the sourcing feature of the SMCS 214. This recommendation may be triggered when the number of requisition spend transactions is greater than one and one-half (or other suitable threshold) the average number of requisition spend transactions per customer in the community according to the spend data selected by the particular customer using the global selector (e.g., 602 or 702).

Yet another type of recommendation recommends that the particular customer should drive more spending using the sourcing feature of the SMCS 214. This recommendation may be triggered when the number of requisition spend transactions is greater than one and one-half (or other suitable threshold) the average number of requisition spend transactions per customer in the community according to the spend data selected by the particular customer using the global selector (e.g., 602 or 702).

Yet another type of recommendation recommends that the particular customer consolidate spend into fewer purchase orders. This recommendation may be triggered when the number of purchase order spend transactions is greater than one and one-half (or other suitable threshold) the average number of purchase order spend transactions per customer in the community according to the spend data selected by the particular customer using the global selector (e.g., 602 or 702).

Yet another type of recommendation recommends that the particular customer use more electronic invoicing channels. This recommendation may be triggered when the number of invoice spend transactions is greater than one and one-half (or other suitable threshold) the average number of invoice spend transactions per customer in the community according to the spend data selected by the particular customer using the global selector (e.g., 602 or 702).

Yet another type of recommendation recommends that the particular customer use top rated community suppliers. This recommendation may be triggered when the number of top suppliers for the particular customer is less than one-third (or other suitable threshold) of the number of top suppliers on average number per customer in the community according to the spend data selected by the particular customer using the global selector (e.g., 602 or 702).

Yet another type of recommendation recommends that the particular customer review their high-risk suppliers. This recommendation may be triggered when the number of high-risk suppliers for the particular customer is more than one-third (or other suitable threshold) of the total number of top-N (e.g., ten) suppliers for the particular customer according to the spend data selected by the particular customer using the global selector (e.g., 602 or 702).

Yet another type of recommendation recommends that the particular customer review the health of certain suppliers.

This recommendation may be triggered when the number of high-risk suppliers for the particular customer is more than 50% higher (or other suitable threshold) than the number of high-risk suppliers on average per customer in the community according to the spend data selected by the particular customer using the global selector (e.g., 602 or 702).

Example Computer System

FIG. 1 is a block diagram that illustrates a computer system 100 with which techniques for community-based spend analysis in a software as a service computing environment may be embodied. Computer system 100 includes a bus 102 or other communication mechanism for communicating information, and a hardware processor 104 coupled with bus 102 for processing information. Hardware processor 104 may be, for example, a general-purpose microprocessor, a central processing unit (CPU) or a core thereof, a graphics processing unit (GPU), or a system on a chip (SoC). Computer system 100 may include one or more hardware processors 104 coupled with bus 102. Thus, reference in the following to a single processor 104 is intended to encompass multi-processor 104 computer systems 100.

Computer system 100 also includes a main memory 106, typically implemented by one or more volatile memory devices, coupled to bus 102 for storing information and instructions to be executed by processor 104. Main memory 106 also may be used for storing temporary variables or other intermediate information during execution of instructions by processor 104. Computer system 100 may also include a read-only memory (ROM) 108 or other static storage device coupled to bus 102 for storing static information and instructions for processor 104. A storage system 110, typically implemented by one or more non-volatile memory devices, is provided and coupled to bus 102 for storing information and instructions.

Computer system 100 may be coupled via bus 102 to a display 112, such as a liquid crystal display (LCD), a light emitting diode (LED) display, or a cathode ray tube (CRT), for displaying information to a computer user. Display 112 may be combined with a touch sensitive surface to form a touch screen display. The touch sensitive surface is an input device for communicating information including direction information and command selections to processor 104 and for controlling cursor movement on display 112 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

An input device 114, including alphanumeric and other keys, may be coupled to bus 102 for communicating information and command selections to processor 104.

Another type of user input device may be cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Instructions, when stored in non-transitory storage media accessible to processor 104, such as, for example, main memory 106 or storage system 110, render computer system 100 into a special-purpose machine that is customized to perform the operations specified in the instructions. Alternatively, customized hard-wired logic, one or more ASICs or FPGAs, firmware and/or hardware logic which in combination with the computer system causes or programs computer system 100 to be a special-purpose machine.

A computer-implemented process may be performed by computer system 100 in response to processor 104 executing one or more sequences of one or more instructions contained in main memory 106. Such instructions may be read into main memory 106 from another storage medium, such as storage system 110. Execution of the sequences of instructions contained in main memory 106 causes processor 104 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 110) and/or volatile media (e.g., main memory 106). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 102. Transmission media can also take the form of acoustic or light waves, such as those generated during radio-wave and infra-red data communications.

Computer system 100 also includes a network interface 118 coupled to bus 102. Network interface 118 provides a two-way data communication coupling to a wired or wireless network link 120 that is connected to a local, cellular or mobile network 122. For example, communication interface 118 may be IEEE 802.3 wired "ethernet" card, an IEEE 802.11 wireless local area network (WLAN) card, a IEEE 802.15 wireless personal area network (e.g., Bluetooth) card or a cellular network (e.g., GSM, LTE, etc.) card to provide a data communication connection to a compatible wired or wireless network. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through network 122 to a local computer system 124 that is also connected to network 122 or to data communication equipment operated by a network access provider 126 such as, for example, an internet service provider or a cellular network provider. Network access provider 126 in turn provides data communication connectivity to another data communications network 128 (e.g., the internet). Networks 122 and 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the networks 122 and 128, network link 120 and communication interface 118. In the internet example, a remote computer system 130 might transmit a requested code for an application program through network 128, network 122 and communication interface 118. The received code may be executed by processor 104 as it is received, and/or stored in storage device 110, or other non-volatile storage for later execution.

Extensions and Alternatives

While techniques for community-based spend analysis in a software as a service computing environment have been described in some detail with specific reference to an exemplary embodiment and certain alternatives, there is no intent to limit the techniques to that particular embodiment or those specific alternatives. For example, those skilled in the art will appreciate that modifications may be made to the exemplary embodiment without departing from the techniques of the present disclosure.

The invention claimed is:

1. A computer implemented method executed using two or more spend management cloud systems (SMCS) each in a different region and coupled to regional data/object storage and communicatively coupled to computers of suppliers and computers of customers and to a plurality of enterprise resource planning (ERP) systems via a data network, the customers comprising a particular customer and a plurality of customers, the method comprising:
   importing spend data from the ERP systems into the SMCS via a REST API, the spend data comprising a plurality of spend data lines from both the computer of the particular customer and the computers of the plurality of customers;
   using a trained deep learning classifier to classify the spend data lines in a set of standard spend categories, the trained deep learning classifier being programmed to perform sequence classification using a trained long short-term memory recurrent neural network (LSTM/RNN) being programmed using word vector representations and embedding layers to predict a category for an input sequence, the set of standard spend categories corresponding to set of standard commodity codes of a standard taxonomy of commodities, the spend data lines in part comprising inconsistent or new text descriptions of commodities in a particular spend category, the LSTM/RNN having been trained based on actual or synthetically generated spend data lines with corresponding spend category labels;
   computing a first aggregate of monetary amounts from a first set of classified spend data lines associated with the particular customer having a user account with the spend management cloud service;
   computing a second aggregate of monetary amounts from a second set of classified spend data lines associated with a community of the plurality of customers having separate user accounts with the spend management cloud service, the second aggregate of monetary amounts comprising community-based spend aggregates that are computed from a set of spend data that has been collected from the community comprising a plurality of regional SMCS instances, the second aggregate comprising one or more of: number of distinct individual commodities per family spend category per supplier, number of distinct customers per family spend category per supplier, average per-customer spend amount, average per-customer transaction amount, total spend amount, total spend transaction amount, each being associated with one of the spend categories;
   causing display of a graphical user interface that includes a visible representation of the first aggregate monetary amount for comparison with a visible representation of the second monetary amount; and
   wherein the method is performed by a computing system having one or more processors and storage media storing one or more programs, the one or more programs including instructions configured to perform the method.

2. The method of claim 1, wherein the set of commodity codes from the standard coding of commodities is selected from the group consisting of: a set of United Nations Standard Products and Services Code (UNSPSC) family codes, a set of Common Procurement Vocabulary (CPV) group codes, a set of GS1 Global Product Classification (GPC) family codes, and a set of eCl@ss main group codes.

3. The method of claim 1, wherein each spend data line has a text description of a commodity on which classification of the spend data line is based.

4. The method of claim 1, wherein each spend data line in the first set of classified spend data lines is classified in a same particular standard spend category of the set of standard spend categories.

5. The method of claim 1, wherein each spend data line in the second set of classified spend data lines is classified in the same particular standard spend category of the set of standard spend categories in which each spend data line in the first set of classified spend data lines is classified.

6. The method of claim 1, further comprising:
   causing display of the graphical user interface that includes a visible representation of a particular spend category corresponding to a same particular commodity code.

7. One or more non-transitory computer-readable media storing one or more programs for execution by a computing system having one or more processors, the computing system comprising two or more spend management cloud systems (SMCS) each in a different region and coupled to regional data/object storage and communicatively coupled to computers of suppliers and computers of customers and to a plurality of enterprise resource planning (ERP) systems via a data network, the customers comprising a particular customer and a plurality of customers, the one or more programs comprising instructions configured for:
   importing spend data from the ERP systems into the SMCS via a REST API, the spend data comprising a plurality of spend data lines from both the computer of the particular customer and the computers of the plurality of customers;
   using a trained deep learning classifier to classify the spend data lines in a set of standard spend categories, the trained deep learning classifier being programmed to perform sequence classification using a trained long short-term memory recurrent neural network (LSTM/RNN) being programmed using word vector representations and embedding layers to predict a category for an input sequence, the set of standard spend categories corresponding to set of standard commodity codes of a standard taxonomy of commodities, the spend data lines in part comprising inconsistent or new text descriptions of commodities in a particular spend category, the LSTM/RNN having been trained based on actual or synthetically generated spend data lines with corresponding spend category labels;

computing a first aggregate of monetary amounts from a first set of classified spend data lines associated with the particular customer having a user account with the spend management cloud service;

computing a second aggregate of monetary amounts from a second set of classified spend data lines associated with a community of the plurality of customers having separate user accounts with the spend management cloud service, the second aggregate of monetary amounts comprising community-based spend aggregates that are computed from a set of spend data that has been collected from the community comprising a plurality of regional SMCS instances, the second aggregate comprising one or more of: number of distinct individual commodities per family spend category per supplier, number of distinct customers per family spend category per supplier, average per-customer spend amount, average per-customer transaction amount, total spend amount, total spend transaction amount, each being associated with one of the spend categories;

causing display of a graphical user interface that includes a visible representation of the first aggregate monetary amount for comparison with a visible representation of the second monetary amount.

8. The one or more non-transitory computer-readable media of claim 7, wherein the set of commodity codes from the standard coding of commodities is selected from the group consisting of: a set of United Nations Standard Products and Services Code (UNSPSC) family codes, a set of Common Procurement Vocabulary (CPV) group codes, a set of GS1 Global Product Classification (GPC) family codes, and a set of eCl@ss main group codes.

9. The one or more non-transitory computer-readable media of claim 7, wherein each spend data line has a text description of a commodity on which classification of the spend data line is based.

10. The one or more non-transitory computer-readable media of claim 7, wherein each spend data line in the first set of classified spend data lines is classified in a same particular standard spend category of the set of standard spend categories.

11. The one or more non-transitory computer-readable media of claim 7, wherein each spend data line in the second set of classified spend data lines is classified in the same particular standard spend category of the set of standard spend categories in which each spend data line in the first set of classified spend data lines is classified.

12. The one or more non-transitory computer-readable media of claim 7, the instructions further comprising instructions configured for:
causing display of the graphical user interface that includes a visible representation of a particular spend category corresponding to a same particular commodity code.

13. A computing system comprising:
one or more processors;
storage media;
one or more programs stored in the storage media and configured for execution by the one or more processors;
the computing system comprising two or more spend management cloud systems (SMCS) each in a different region and coupled to regional data/object storage and communicatively coupled to computers of suppliers and computers of customers and to a plurality of enterprise resource planning (ERP) systems via a data network, the customers comprising a particular customer and a plurality of customers;
the one or more programs including instructions configured for:
importing spend data from the ERP systems into the SMCS via a REST API, the spend data comprising a plurality of spend data lines from both the computer of the particular customer and the computers of the plurality of customers;
using a trained deep learning classifier to classify the spend data lines in a set of standard spend categories, the trained deep learning classifier being programmed to perform sequence classification using a trained long short-term memory recurrent neural network (LSTM/RNN) being programmed using word vector representations and embedding layers to predict a category for an input sequence, the set of standard spend categories corresponding to set of standard commodity codes of a standard taxonomy of commodities, the spend data lines in part comprising inconsistent or new text descriptions of commodities in a particular spend category, the LSTM/RNN having been trained based on actual or synthetically generated spend data lines with corresponding spend category labels;
computing a first aggregate of monetary amounts from a first set of classified spend data lines associated with the particular customer having a user account with the spend management cloud service;
computing a second aggregate of monetary amounts from a second set of classified spend data lines associated with a community of the plurality of customers having separate user accounts with the spend management cloud service, the second aggregate of monetary amounts comprising community-based spend aggregates that are computed from a set of spend data that has been collected from the community comprising a plurality of regional SMCS instances, the second aggregate comprising one or more of: number of distinct individual commodities per family spend category per supplier, number of distinct customers per family spend category per supplier, average per-customer spend amount, average per-customer transaction amount, total spend amount, total spend transaction amount, each being associated with one of the spend categories;
causing display of a graphical user interface that includes a visible representation of the first aggregate monetary amount for comparison with a visible representation of the second monetary amount.

14. The computing system of claim 13, wherein the set of commodity codes from the standard coding of commodities is selected from the group consisting of: a set of United Nations Standard Products and Services Code (UNSPSC) family codes, a set of Common Procurement Vocabulary (CPV) group codes, a set of GS1 Global Product Classification (GPC) family codes, and a set of eCl@ss main group codes.

15. The computing system of claim 13, wherein each spend data line has a text description of a commodity on which classification of the spend data line is based.

16. The computing system of claim 13, wherein each spend data line in the first set of classified spend data lines is classified in a same particular standard spend category of the set of standard spend categories.

17. The computing system of claim 13, wherein each spend data line in the second set of classified spend data lines is classified in the same particular standard spend category of the set of standard spend categories in which each spend data line in the first set of classified spend data lines is classified.

\* \* \* \* \*